FIG.1

INVENTOR
BARNEY J. CARR
BY Teller & McCormick
ATTORNEYS

July 21, 1964 B. J. CARR 3,141,975
PULSED NEUTRON GENERATOR WITH HIGH VACUUM AND
CONTROL GRID BETWEEN ION SOURCE AND TARGET
Filed Jan. 12, 1960 9 Sheets-Sheet 4

July 21, 1964

B. J. CARR 3,141,975

PULSED NEUTRON GENERATOR WITH HIGH VACUUM AND
CONTROL GRID BETWEEN ION SOURCE AND TARGET

Filed Jan. 12, 1960

July 21, 1964   B. J. CARR   3,141,975
PULSED NEUTRON GENERATOR WITH HIGH VACUUM AND
CONTROL GRID BETWEEN ION SOURCE AND TARGET
Filed Jan. 12, 1960   9 Sheets-Sheet 6

United States Patent Office 3,141,975
Patented July 21, 1964

3,141,975
PULSED NEUTRON GENERATOR WITH HIGH VACUUM AND CONTROL GRID BETWEEN ION SOURCE AND TARGET
Barney J. Carr, Colorado Springs, Colo., assignor to Kaman Aircraft Corporation, a corporation of Connecticut
Filed Jan. 12, 1960, Ser. No. 1,979
20 Claims. (Cl. 250—84.5)

This invention relates to neutron generators and particularly to rapidly pulsed readily portable neutron generators utilizing low energy acceleration of positive ions and a target of material arranged to be bombarded by the ion beam particles.

In carrying out of various experimental and test procedures in the field of nuclear physics, it is necessary to subject various materials to neutron radiation. This requires a neutron source. Since many of the procedures require rapid repetition of an intense short pulse of neutrons, it is highly desirable to have a neutron source which will operate in this manner. The neutron sources heretofore available were either much too large and immobile to be usable for certain areas of work (oil well logging, nuclear reactor research, activation analysis, etc.) or were incapable of rapid repetition of a high intensity pulse.

The present invention is concerned with overcoming these difficulties and has for a primary object an improved portable neutron source or neutron generator which will operate at high neutron output level (approximately $10^7$ neutrons per pulse) with pulse length lasting several microseconds and pulse rates greater than 10 pulses per second.

As will hereinafter appear, this object of the invention is accomplished by novel improvements to the ion pump, the ion sources, the pulse transformer, the arrangement of accelerator tube components, and certain novel circuit improvements.

An important object of the invention is to provide an improved positive ion accelerator tube of the pulsed type which is particularly adapted for use as a component of a portable source to insure a high rate neutron emission per pulse and a high rate of pulsing.

Another object is to provide improvements in ion optics in accelerator tubes for neutron generators.

A further object is to provide improvements in both the components, component arrangement and circuitry of a pulsed neutron generator adapted for either well logging or laboratory use.

Other objects are to improve and simplify the construction of a highly compact neutron generator in a manner to permit fabrication at relatively low manufacturing cost, the improved unit being of rugged construction and operable over a long service life with a minimum of maintenance.

Other objects and advantages will become apparent to persons skilled in the art, as will various modifications thereof without departure from the inventive principles as defined in the appended claims.

The drawings show three embodiments of the invention and such embodiments will be described, but it will be understood that various changes may be made from the constructions disclosed, and that the drawings and descriptions are not to be construed as defining or limiting the scope of the invention, the claims forming a part of this specification being relied upon for that purpose.

In the drawings:

FIGS. 1 to 7 show a neutron generating unit constructed in accordance with the invention, FIG. 1 being a fragmentary longitudinal sectional view.

General Comments

While it is known how to produce fast neutrons, for example 14.3 mev., by a $T(d, n)He^3$ reaction in short pulses for example a few microseconds in length) devices productive of that result have heretofore been either quite bulky and not adapted for portable use or have not permitted rapid repetitive pulsing which is necessary in certain types of use and experimentation. Both portability and the capability of producing rapid high intensity pulses of neutrons are necessary for certain test and research work as, for example, some oil well logging, some nuclear reactor tests, and some laboratory nuclear research.

Alternative neutron generators are herein illustrated and described and each of them operates effectively over long periods of use to produce approximately $10^7$ neutrons per pulse with a pulse length of approximately 4 microseconds and permits a pulse rate of greater than 10 pulses per second. The principles taught herein are of course not limited to a generator of neutrons at one particular energy level and with suitable modifications the illustrated generators will operate in an equally dependable manner to produce neutrons at other energy levels. For example, while each apparatus herein described involves a T—D reaction, it is apparent that with certain modifications of the ion source, target, and voltages employed, either a D—T, or a D—D, reaction could be obtained, the characteristics of which are known in the art.

*Neutron Generator as Shown in Figs. 1 to 7*

Figure 1:
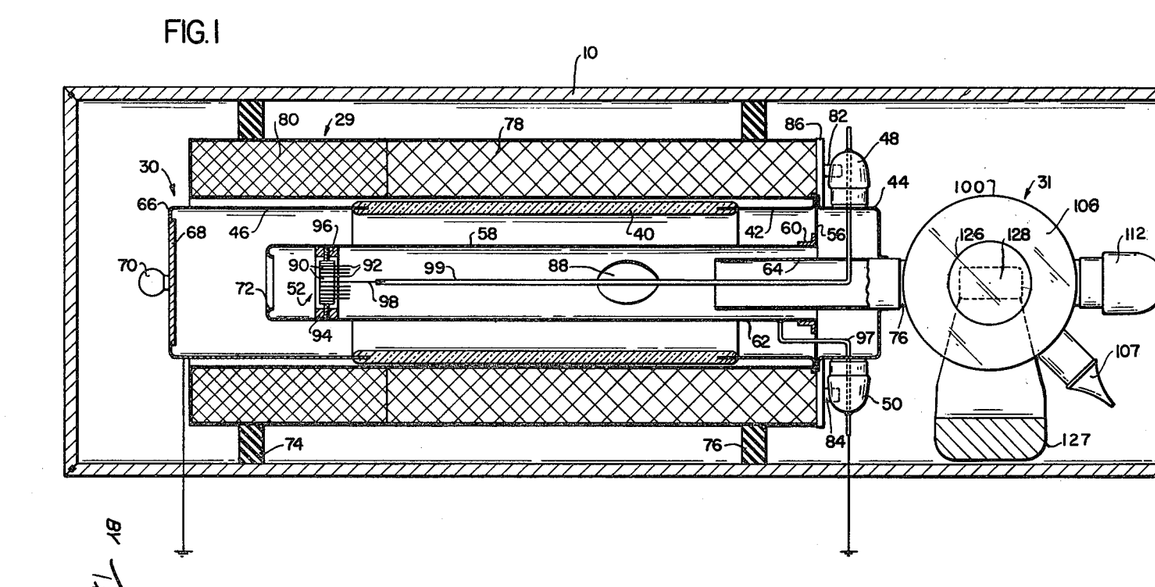
Figure 4:
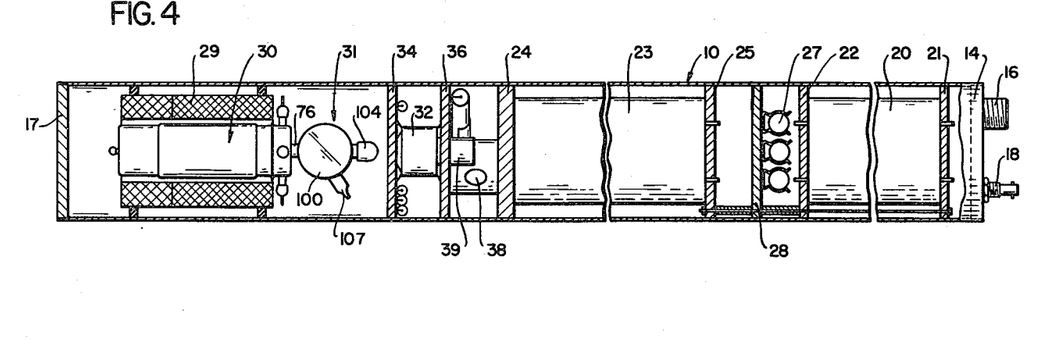
FIG. 4 is a broken view, largely in longitudinal section, of a complete neutron generator including the neutron generating unit and associated elements as designed especially for oil well logging use in accordance with the invention.

FIGS. 1 and 4 show one form of a compact neutron generator incorporating the principles of the invention, the generator including all of the components required for operation when connected to a remote unit from which it receives alternating current at line voltages and from which it receives actuating pulses.

The generator is housed in an elongated metal cylinder 10. When the generator is primarily adapted for well logging or the like, the cylinder 10 may be between three and four feet in length and of a diameter such as about four inches, so as to permit the unit to be lowered into the bore of an oil well or the like. One end of the cylinder 10, the upper end during use, is capped by a metal disc 14, O-ring sealed thereto, through which electric fixtures 16 and 18 extend for connection to both an A.C. power source and to a remote source of pulsed actuating signals. The opposite or lower end of the cylinder 10 is closed by a welded disc 17. The housing thus formed is hermetically sealed and it is preferably filled with oil or gas to protect the generator components from voltage breakdown.

Figure 6:
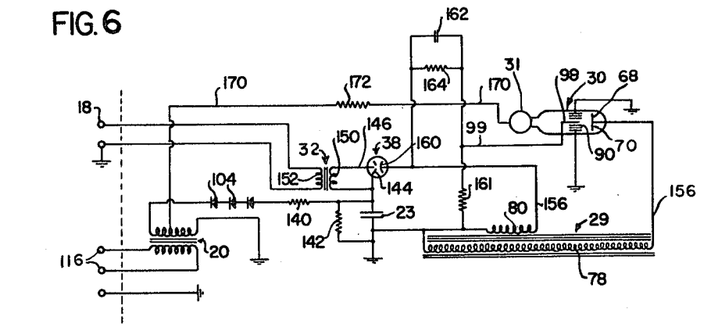
FIG. 6 is a circuit diagram for the device shown in FIG. 4.

Basically, the components within housing 10, as shown in FIG. 4, include an A.C. power transformer 20, mounted between partitions 21 and 22 of electrically insulating material, a condenser 23 of large capacity mounted between partitions 24 and 25, three diodes 27 in fixtures supported by a partition 28, a target pulse transformer 29, and a positive ion accelerator neutron source tube 30 having an associated ion pump 31, a small pulse transformer 32 mounted between partitions 34 and 36, and a trigatron tube 38 and other small components 39 between partitions 24 and 36 and on partition 34 to complete the assembly, the wiring diagram of which is shown in FIG. 6.

When the neutron generator is primarily adapted for laboratory use, the power supply parts can be separated from the neutron accelerator tube assembly, in which case this latter assembly may be encased in a cylinder similar to the cylinder 10 but much shorter.

The neutron generator unit, as shown in FIG. 1, includes the before mentioned positive ion accelerator neutron source tube 30. The tube is vacuum sealed and is continuously pumped by its associated ion pump 31. Said tube 30 is an assembly housed in a glass and metal cylinder comprising a cylindrical glass insulator 40, the ends of which have bonded thereto, by glass to metal seals, upper and lower metal sleeves 42 and 46 which constitute sleeve extensions. A metal cap 44 provides an end closure for the upper sleeve 42, the cap 44 being peripherally apertured to receive insulators 48 and 50. The cap 44 has an inner flanged margin, as does the outer end of the sleeve 42, and a centrally apertured disc 56 has its margin disposed between the flanges, said flanges and the disc being welded in a unitary assembly so as to complete the end enclosure and so as to properly position the disc 56. A metallic inner cylinder 58 is centrally positioned within the accelerator tube 30, said cylinder extending through the central aperture in the disc 56 and being supported on said disc by means of an annular bracket 60 welded to said disc and said cylinder. The before mentioned ion source 52 is positioned within and near the opposite end of the cylinder 58.

A portion of a centrally positioned cylindrical conduit 64 extends through a central aperture in the end wall of the cap 44 to which it is welded. The upper portion of the conduit 64 has a smaller diameter as indicated at 76, this last said portion having a sealed connection with the ion pump 31. The lower end of the lower sleeve 46 terminates in an annular flange 66 for the marginal support of a disc target 68 to complete the glass and metal cylindrical enclosure which is sealed to the atmosphere. The target 68 has fixed to the lower face thereof a high voltage connector 70 of the ball type, the conductor leading therefrom and other connections being omitted from FIG. 1 inasmuch as they are clearly shown in the wiring diagram of FIG. 6. The lower or free end of inner cylinder 58 is provided with a polished inwardly rolled margin 72 defining an aperture through which ions are drawn by the target 68 from the source 52 as explained in detail below. The wall of the cylinder 58 is ported as at 88 to facilitate gas flow between the interior of the glass and metal cylinder 30 and the ion pump 31 through the said conduit 64.

The above described glass and metal enclosure or source tube 30 is received in the bore of the before mentioned cylindrical target pulse transformer 29. The pulse transformer is supported within the housing 10 by suitable annular insulators 74 and 76 spaced axially as shown. The transformer 29 is of the auto type with the windings encased in a cylindrical housing of epoxy resin cast under high pressure, for example at 3500 p.s.i., to obtain a rugged structure of high dielectric characteristics. The transformer 29 comprises an upper secondary winding 78 and a lower primary winding 80. The lower end of the primary winding is above the level of the target 68 and the upper end of said primary winding is above the level of the ion source 52. The length of the secondary winding 78 is shown as being a little more than twice that of the primary winding 80. Three winding leads are brought out at the upper end of the secondary section 78 through an insulating tube clamp bracket 86, two of the three leads being shown at 82 and 84.

The ion source 52 produces a high density space charge neutralized deuterium ion cloud or plasma when an interleaved stack of titanium discs or washers having deuterium gas occluded therein are peripherally arced by electrical pulses sufficiently to drive out the occluded deuterium. While it is broadly known how to produce a plasma by arcing a stack of gas occluded discs, the present structure involves a novel and particularly effective disposition of the involved elements with confinement of the resulting plasma to a relatively small area externally of the stack from where it may rapidly be accelerated to target 68, which is of tritium loaded titanium, for the production of neutrons at a high output rate.

Figure 2:
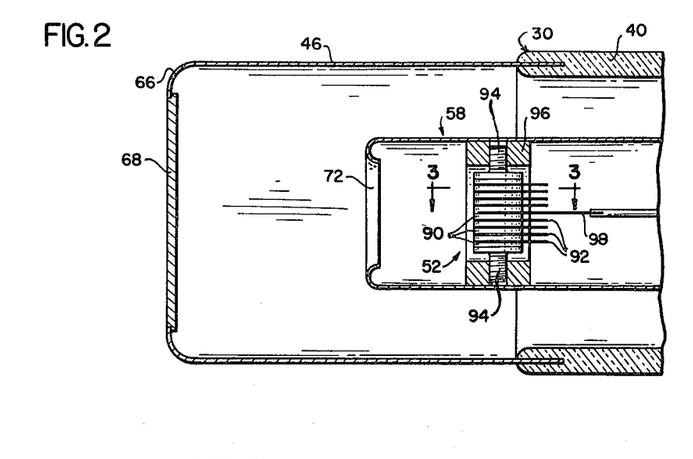
FIG. 2 is an enlarged fragmentary view showing in longitudinal section the improved ion source included in the neutron generating unit shown in FIG. 1.
Figure 3:
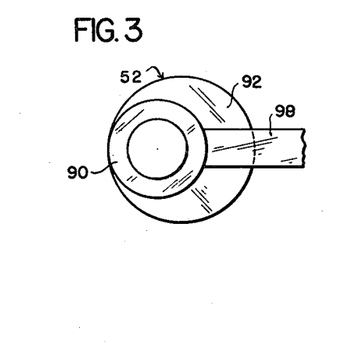
FIG. 3 is a fragmentary front elevational view of the ion source as shown in FIGS. 1 and 2.

As best shown in FIGS. 2 and 3, source 52 includes a stack of titanium discs 90 in which deuterium has been occluded by the known process of outgassing the titanium discs under heat to permit the metal to absorb large quantities of the gas. While titanium is preferred for this purpose, other transition metals such as tantalum, zirconium, or the like may be used; however, titanium will absorb larger amounts of the hydrogen isotopes than the others, hence it is used both in the ion source discs 90 and in target 68 in which deuterium or tritium is occluded. Discs 90 are maintained clamped between mica insulating discs 92, and as shown in FIG. 2, the stack is held radially within cylinder 58 between a pair of flatheaded stud bolts 94 which are diametrically disposed in screw-threaded relation to a metal ring 96 welded to cylinder 58. While the drawings show only four discs 90, a larger number may be used in actual practice for increased efficiency.

Mica discs 92 and titanium discs 90 are peripherally aligned at the lower left side of the stack as shown in FIGS. 2 and 3, with the positions of the edges of the mica discs progressively increasing radially to prevent arcing in all but the lower or frontal area of the discs. A strip of metal 98 of high melting point and good electrical conductivity is clamped between the two centrally disposed discs 90 to provide a pulse lead, the strip 98 being in direct contact with those discs. The lead 98 is electrically connected with a conductor 99 extending through the before mentioned insulator 48 on the cap 44. The cylinder 58 is grounded by a conductor 97 welded thereto and brought out through the before mentioned insulator 50 on the cap 44. It will be apparent that the opposite ends of the ion source stack are grounded through the ring 96 and the studs 94 and that the opposite portions of the stack are connected in series between each side of pulse lead 98 and the ground for interarcing of the discs 90 in response to applied pulses.

The ion source 52 above described has been found particularly effective even when produced on a very small scale. For example, the discs 90 need not be larger than 1/16" in diameter or more than .010" in thickness. Mica discs 92 need not be more than fifty percent larger in diameter than discs 90 and not more than .002" in thickness. The arc area is confined to a small portion of the diameter of the discs and a highly localized plasma producing surface is involved.

As will be readily understood, the production of a plasma as above requires a surrounding vacuum, and since the arc expelled gases contaminate that vacuum, the glass and metal envelope or source tube 30 which encloses the ion source 52 must be pumped to maintain the desired degree of vacuum. The function of the ion pump 31 is continuously to draw off the neutral gas which does not enter into the neutron producing reaction through target bombardment. The pump 31 is connected with the inner tube 58 by means of the conduit 64, 76 and the inner tube 58 is connected with the outer envelope or tube 30 by means of the port 88.

Figure 5:
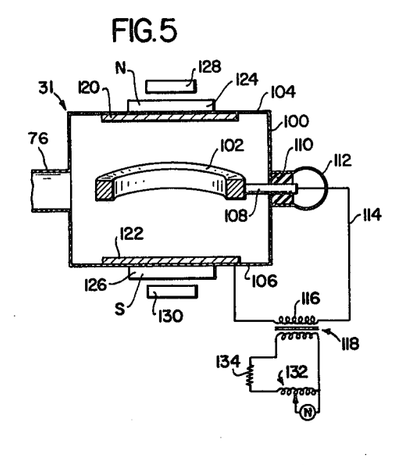
FIG. 5 is a perspective view showing the construction of the ion pump and gage shown in FIGS. 1 and 4.

The ion pump 31, as best shown in FIG. 5, comprises a cylindrical housing 100 having its sides wall formed from a non-magnetic metal and having end plates 104 and 106. The chamber within the housing is connected with the inner tube 58 and the outer tube 30 by means of the conduit 64, 76. A collector ring 102 is located within the housing and it is centrally disposed midway between the end plates 104 and 106. The ring 102 is of titanium metal and it is mounted in insulated relation to the housing 100 by a shank 108 fixed in a bushing insulator 110. A glass or ceramic insulating cap 112 extends from the bushing 110 and supports a high tension lead-in conductor 114 connected with the secondary winding 116 of a step-up transformer 118, said winding 116 being also connected with the housing 100. The primary winding of the transformer 118 is controlled by an autotransformer 132 and a current limiting resistor 134. It will be observed that the transformer winding 116 is connected between the titanium ring 102 and the end plates 104 and 106. Located with the housing 100 and attached respectively to the end plates 104 and 106 are disc-like electrodes 120 and 122, these electrodes being located in register with the ring 102. The electrodes are preferably formed of titanium or of other material such as zirconium, tantalum, etc., capable of absorbing substantial quantities of gas. Since the function of electrodes 120 and 122 is to absorb ions during the operation of the pump, the electrode material is degassed in a known manner prior to assembly of the pump. For the purpose of producing and directing a high coercive force magnetic field axially of the ring and the electrode assembly, two soft iron pole pieces 124 and 126 are provided which are located externally of the housing 100 and which are carried respectively by the end walls 104 and 106. The pole pieces 124 and 126 are in register respectively with the electrodes 120 and 122. A permanent magnet 127 (of FIG. 1) is positioned to locate its opposite pole faces 128 and 130 thereof respectively adjacent the pole pieces 124 and 126 to complete the assembly.

The purpose of the pump 31 is to produce a high vacuum during the operation of the ion source, and as above stated, the interior of the pump and the interconnected ion source and accelerator tube are initially evacuated to a vacuum in the order of 0.001 to 0.0001 micron, this being effected through copper pinchoff 107. With the application of energizing potential from the transformer 118, a cold cathode electric discharge is established between the ring 102 and the electrodes 120 and 122. With the ring 102 positive on the half cycle, free electrons within the housing 100 are drawn to the ring, but the axial magnetic field supplied by magnet 127 of FIG. 1 prevents the electrons from reaching the ring 102 by a linear path. The electrons are influenced by the magnetic field to follow spiral trajectories established thereby, thus greatly extending their paths and increasing the probabilities of ion producing collisions with gas molecules. Ions thus produced being positive, are collected by the negatively charged electrodes 120 and 122, with those electrons not causing collisions and those resulting from such collisions being collected by ring 102. The transformer 118 has a sufficiently high output potential to cause ions thus accelerated toward the electrodes to be driven therein for removal from the housing 100. When the ring 102 is negative on the half cycle no gas discharge occurs. As will be apparent, a direct potential could be applied to ring 102 for continuous operation in the above manner.

While the principles of extending the electron paths above described are known, pumping speeds up to a factor of 10 over prior art pumps operating on those principles have been obtained by the use of titanium or a similar metal having "getting" characteristics as the ring material. During operation of the pump there is considerable sputtering action of the ring with a resultant increase on the pumping speed with the ring materials heretofore suggested and which do not "get". The use of a "getter" material for ring 102, permitting pumping speeds far beyond those previously believed possible in pumps of this type represents a very important advance in the art.

In addition to the primary pumping function of the pump 31, the pump is utilized in accordance with the invention to also serve as a vacuum pressure gage. The relation between the gas pressure (degree of vacuum) within housing 100 and the potential applied between ring 102 and electrodes 120, 122 is such that the pump current is a measure of vacuum. This feature eases processing of the vacuum tube. This current can be measured by inserting a current measuring meter (such as a milliammeter) in conductor 114 of FIG. 5; the vacuum being related to this current in a direct logarithmic fashion.

Figure 7:
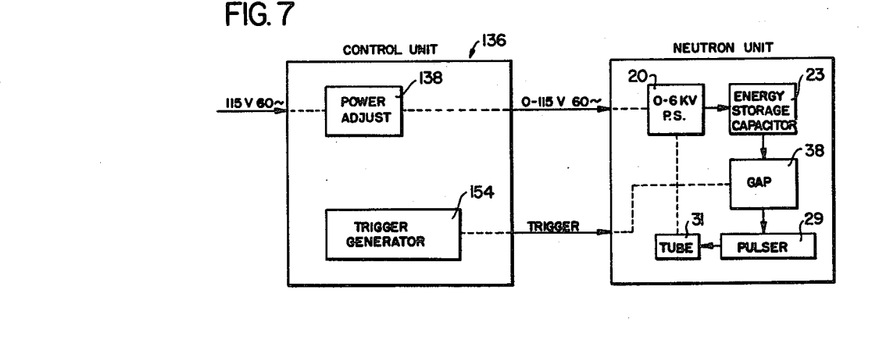
FIG. 7 is a block diagram illustrating the major components of the neutron generator and also illustrates the connection to a control unit remote therefrom.

Referring to the circuits of FIGS. 6 and 7, operation of the device is as follows. With a source of alternating current from the control unit 136 and regulated by a power adjustment device 138 as shown, applied to transformer 20 through terminals at 116, a D.C. output is applied across the storage condenser 23 from the half wave rectifier network comprising diodes 104 and resistors 140 and 142, the condenser 23 being thus charged. The major components of the circuit employ a common ground return, and the nongrounded side of the condenser 23 is connected to one of the arcing electrodes 144 and 146 of the trigatron control tube 38. The other one of the arcing electrodes is connected with the secondary winding 150 of the pulsed output of transformer 32. The primary winding 152 of the pulse transformer 32 is pulsed from a remote trigger generator 154 in the control unit 136, the output of the generator 154 being connected to the transformer winding 152 through a terminal at 18 and a ground connection. The generator 154 is of a known type wherein the pulse rate may be varied at will. The transformer 32 has a very fast rise time to permit employment of pulse durations in the order of a few microseconds.

Since the primary winding 152 of the pulse transformer 32 is grounded and since the secondary winding 150 is connected to the arcing electrodes 144 and 146 of tube 38, the transformer serves to fire the tube 38 and to thereby connect the condenser 23 directly across the primary winding 80 of the target pulse transformer 29. The ungrounded end of the secondary winding 78 is connected by a conductor 156 with the terminal 70 on the disc target 68 and the target is thus pulsed. The firing of the tube 38 also serves to connect across the ion source stack 52 the surge current which results from discharge of the condenser 23 across the primary winding 80. An RC leg, with a resistor 161 and a condenser 162 in series, forms a parallel circuit with primary winding 80 across the condenser 23 with the tube 38 conductive. A bleeder resistor 164 shunts the condenser 162, with the value of resistor 164 selected to limit the source arcing potential to that required. The before mentioned conductor 99 is connected between the ungrounded end of dropping resistor 161 and the pulse lead 98 to complete the voltage dividing circuit. C–162 may be 500 to 1500 mmf., R–161 15 to 100 ohms, and R–164 250 to 500 ohms. Since as above described, the stacked titanium discs 90 are series connected between grounded ends, an instantaneous arcing to ground across the discs results with attendant production of a localized deuterium ion plasma adjacent the arcing area of the stack. The rise time of the transformer 29 is selected to permit arcing of the ion source stack 52 slightly ahead of the peak pulsed output of said transformer to the target 68. The rise time of the output pulse from secondary winding 78 of the transformer 29 need be no more than a microsecond or less to insure proper acceleration of the space charge neutralized deuterium ions thus produced into the tritium loaded target 68 for the production of neutrons in a known manner.

If desired, the center tap of the secondary winding of the power transformer 20, FIG. 6 may be connected by a conductor 170 and a series resistor 172 to the ion pump 31. The conductor 170 of FIG. 6 is the same as, or alternative to, the conductor 114 of FIG. 5 which connects to the ring 102 and whose function has been described. The connection 170 is operative on the positive half cycle to aid said pump in maintaining a proper vacuum within the glass and metal envelope 30.

*Neutron Generator as Shown in FIGS. 8 to 12*

Figure 8:
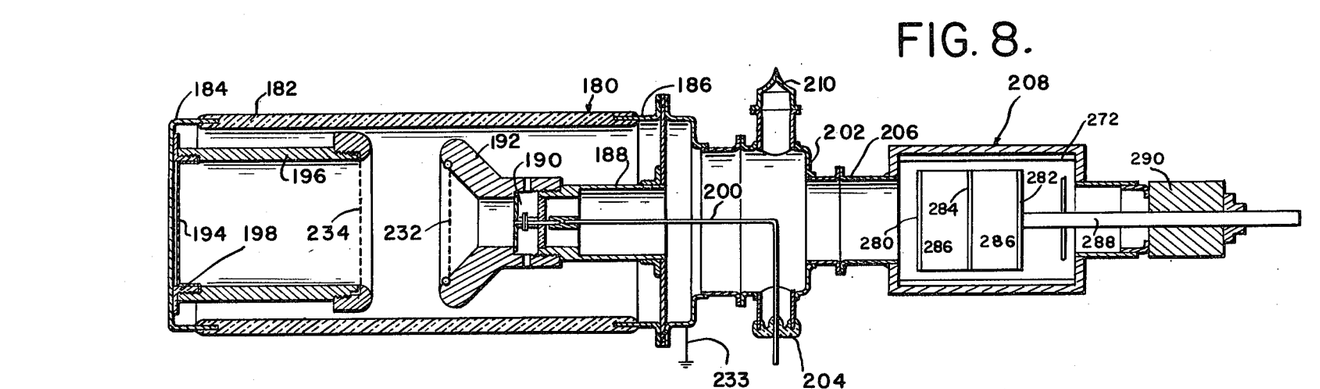
FIG. 8 illustrates in longitudinal section portions of an alternative neutron generator embodying the invention.
Figure 9:
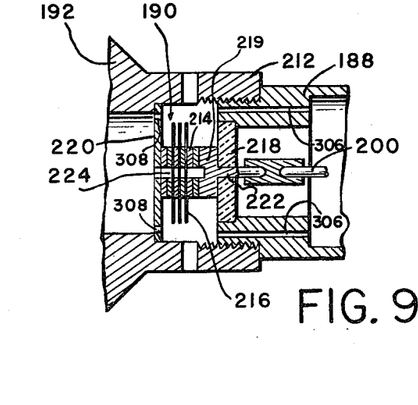
FIG. 9 illustrates, in enlarged section, the details of the ion source of the device of FIG. 8.
Figure 10:
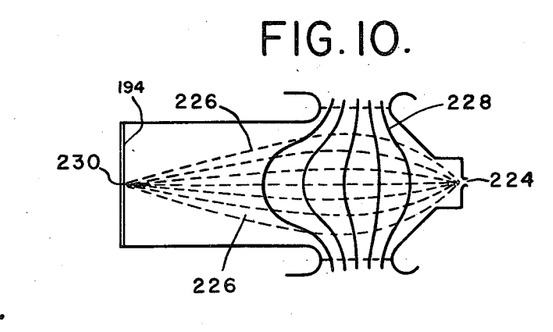
FIG. 10 is an electric field plot illustrating ion trajectories established in the device of FIG. 8 when operated without a source grid.

FIGS. 8 to 10 show a construction which is to some extent alternative to the assembly 30 and the pump 31 as shown in FIGS. 1 to 7. However, it will be observed from the drawing and from the following description that the target is carried by the same tube that carries the ion source and not by a separate outer tube or envelope.

The structure of FIG. 8 comprises generally an evacuated and continuously pumped tubular enclosure generically designated 180. Enclosure 180 includes a main glass cylinder 182 carrying a closure cap 184 at one end thereof and an annular member 186 at the opposite end with metal to glass seals, preferably of the Kovar type. The annular member 186 provides support for a concentrically positioned metal cylinder 188 which in turn provides support for an ion source 190 and a source shield 192. The source 190 is shown in enlarged detail in FIG. 9, and it is below described. The closure cap 184 provides support for a tritium loaded titanium target 194 disposed at one end of a cylindrical target shield 196, bracket mounted at 198 for concentric alignment with the ion source 190 and the source shield 192. A conductor 200 is brought into the enclosure through the wall of a tubular neck 202 fitted with a glass insulator 204 and connected to a pulse source for firing the ion source. A cylindrical conduit 206 provides communication between the neck portion 202 and a vacuum pump 208, which in this instance is an ion pump shown in FIGS. 14 and 15, but which may be an ion pump as above described and shown in in FIGS. 1 and 5. The interior of the ion source assembly is evacuated and sealed at the vacuum pinch-off 210 and said interior continuously maintained by the pump 208 under a high degree of vacuum during use.

The positive ion accelerator assembly 180, FIG. 8, may be associated with other components for the production of high energy neutrons in the manner described above in respect to positive ion accelerator 30 of FIG. 4. With the assembly 180 concentrically disposed within a target pulse transformer such as shown at 29, FIGS. 1 and 4, there is an ion discharge from the source 190 to the target 194.

The unit 190, as best shown in FIG. 9, comprises a metal body 212 which encloses a stack of centrally apertured titanium deuteride washers 214 interleaved between centrally apertured mica insulators 216. The assembly is maintained concentrically of the housing 212 and is clamped between a metallic disc 219 and a centrally apertured metal disc 220. The disc 219 is supported by a ceramic washer 218 which is apertured to receive an electrode 222 integral with the disc 219. The central apertures in the disc 220 and in the washers 214 and in the insulators 216 provide an axial channel 224. The electrode 222 is pulsed from a suitable source connected to the conductor 200 so as to cause the washers 214 to arc over along the peripheries of their aligned central aperture at the axial channel 224.

The disc 220 provides an arcing pulse ground return through the shield 192 and the cylinder 188 and the cylinder supporting structure. A plasma of deuterium ions is thus established in the bore 224 as the deuterium gas occluded titanium disc are arced. Ions escape the bore 224 at the open left or lower end thereof and the ions are discharged onto the target 194. Without the hereinafter described grids, the ions would move along trajectory lines such as 226 shown in FIG. 10, these lines passing through the electrical field shown at 228 in FIG. 10. A lens effect, illustrated by the field lines 228, takes place as the ion paths diverge in a target direction until more than half through the electrical field flux pattern, and thereafter they converge toward the target. The ion trajectories as shown by lines 226 result in a focusing of ions at point 230 on the target, resulting in heat damage to this target.

As shown in FIG. 8, a source grid 232 is provided near the open end of the source shield 192 to extend transversely of the shield axis. The grid is fixed to the shield 192 and thus maintained at the ground potential of the shield supporting structure. The cylindrical target shield 196 is provided at the open upper end thereof with a grid structure 234 which is fixed thereto to be maintained at target potential. The grid extends substantially over the entire projected area of the target.

The grounded source grid 232 controls ion trajectory divergency from the ion escape outlet of plasma source 224 to the plane of the grid. Thereafter the ion trajectory continues to diverge slightly until the trajectory lines are in parallelism with the axis of the target shield 196. The deuterium ions are thus drawn to the target 194 in response to the target pulse potential along parallel paths 229, FIGURE 11, which are evenly dispersed over the target area to insure evenly distributed neutron producing hits on the deuterium loaded target. The irons are thus completely defocused in their path between the ion source and the target by the field established by the grids 232 and 234.

Target shield 196 serves three functions. The first function is to provide support for the ion defocusing grid 234. The second function of the target shield is to protect the glass-to-metal seals at the ends of the tube 182 from high voltage fields which might result in glass puncture. The third function of the shield is to effect a reduction in the field at the target and to thus substantially reduce secondary electron current.

Figure 12:
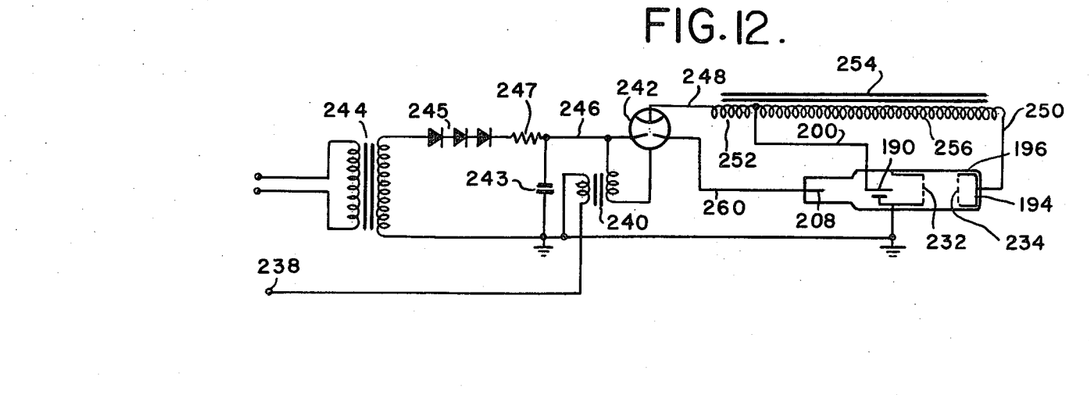
FIG. 12 is a diagram of a preferred circuit for the positive ion accelerators of FIGS. 8 and 12.

The circuit illustrated in FIG. 12 operates in much the same manner as does the above described circuit of FIG. 6. The condenser 243 is charged by the transformer 244 through rectifiers 245 and the resistor 247. A pulse introduced at 238 triggers transformer 240 to fire trigatron 242 and to connect a surge current resulting from discharge of condenser 243 through leads 246 and 248, and across primary 252 of target pulse transformer 254 and through the lead 200 to the ion source 190 to effect plasma producing arcing to ground. An arcing potential of 6000 volts is satisfactory for the source shown in FIG. 9. The secondary winding 256 of target pulse transformer 254 is connected by a conductor 259 with the target 194. Said winding 256 is so wound that it effects a resulting negative target pulse of about 150 kilovolts in response to each primary pulse in the primary winding 252. Conductor 260 may lead to the vacuum pump 208, being similar in function to the conductor 170 shown in FIG. 6.

Figure 13:
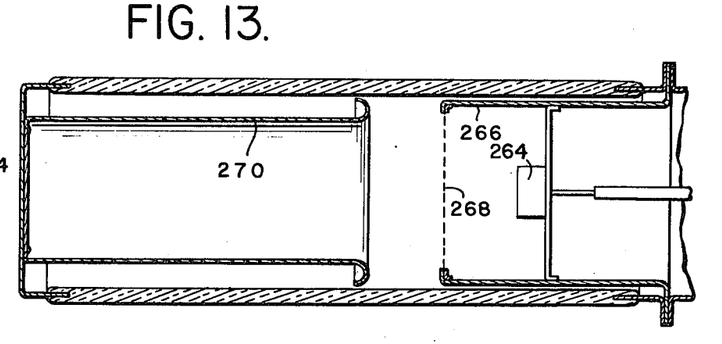
FIG. 13 illustrates a fragmentary longitudinal section of an accelerator tube embodying field shaping by use of a single grid and modified with respect to the tube in FIG. 8.

In the FIG. 8 structure, both the source grid 232 and the target grid 234 are preferably 90% transmission grids, constructed of high melting temperature metal such as tungsten or molybdenum. The electric field established by the target pulse transformer 254 which encloses the structure of FIG. 8 in the same manner as unit 30 is enclosed by transformer 29, FIG. 4, may be modified by a single grid as shown in FIG. 13 to insure proper defocusing of the target drawn ions. While the relation between an ion source 264, a source shield 266 and a source grid 268 is similar to comparable elements of the FIG. 8 structure, a target shield 270 is provided which is of greater axial length than shield 196. With such a long target shield, it is not necessary to provide a target grid at the open end thereof. The structural design of the ion source and target assemblies dictates whether one or both grids are required to effect the desired result.

Figure 14:
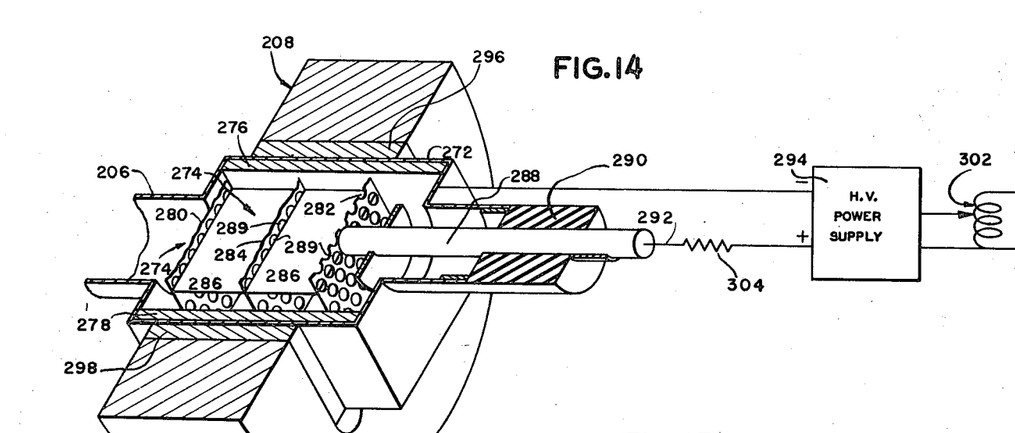
FIG. 14 is an enlarged fragmentary longitudinal sectional view of an ion pump incorporating an alternate embodiment of the ion pump shown in FIGS. 1, 4 and 5.
Figure 15:
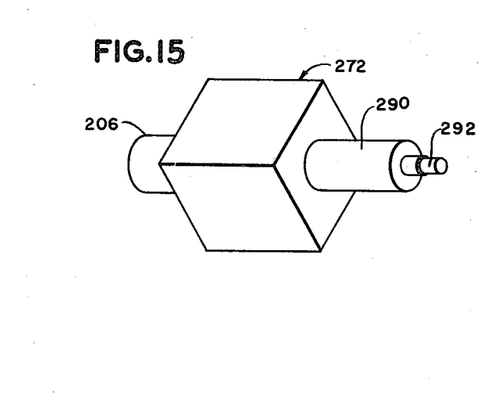
FIG. 15 is a perspective of a portion of the ion pump shown in FIG. 14.

The ion pump 208 is shown only schematically in FIG. 8 and it is shown in detail in FIGS. 14 and 15, comprising a rectangular housing 272 of nonmagnetic material such as stainless steel in which a titanium collector grid structure 274 is centrally disposed midway between spaced titanium side plates 276 and 278. The grid structure 274 consists of an opensided rectangular metallic box having two orthogonal partitions centrally fixed therein. The grid structure 274 includes transverse end walls 280 and 282 and a partition 284 centrally disposed between the end walls. The grid 274 further includes a centrally disposed longitudinal partition 286 connecting the end walls and the central partition. For a purpose to be stated, the end walls 280 and 282 and the partition 284 are provided with closely spaced perforations 289 distributed over their entire areas. The grid 274 is held in insulated relation to the housing 272 by a shank 288 fixed in a bushing insulator 290 of glass or ceramic material extending from the bushing support for a high tension lead-in conductor 292 connecting the high positive voltage power supply 294 between the housing 272. The conductor 292 may be regarded as an alternative to the conductor 260 shown in FIG. 12. Since the function of electrodes 276 and 278 is to absorb ions during operation of the pump, the electrode material is degassed in a known manner prior to assembly of the pump. For the purpose of producing and directing a high coercive force magnetic field H axially of the grid structure and electrode assembly, a pair of soft iron pole pieces 296 and 298 are provided externally of the housing side walls and registered with the electrodes 276 and 278. A permanent magnet 300 is positioned to locate the opposite pole faces thereof adjacent the pole pieces, 296 and 298, to complete the assembly. For simplicity of illustration, the magnet 300 and its pole pieces are omitted from FIG. 8.

The purpose of pump 208 is to produce a high vacuum following an operation of the ion source and as above stated the interior of the pump and the interconnected ion source and accelerating tube are initially evacuated to a vacuum in the order of 0.001 to 0.0001 micron of mercury. With the application of energizing potential from power supply 294, the output of which may be controlled by an autotransformer 302 and a current limiting resistor 304, a cold cathode electric discharge is established between the grid structure 274 and the electrodes 276 and 278. With the grid structure 274 positive, free electrons within the housing 272 are drawn to the grid structure, but the axial magnetic field prevents them from reaching said grid structure by a linear path. The electrons are influenced by the magnetic field to follow spiral trajectories established thereby, thus greatly extending their paths and increasing the probabilities of ion producing collisions with gas molecules. Ions thus produced, being positive, are collected by the negatively charged electrodes 276 and 278, with those electrons not causing collisions and those resulting from such collisions being collected by the grid structure 274. Power supply 294 has a sufficiently high output potential to cause ions thus accelerated toward the electrodes to be driven therein for removal from housing 272. In order that the pump 208 may maintain a vacuum not only in its own chamber but also within the envelope 180, ducts 306, 306 are provided in the member 188 and ducts 308, 308 are provided in the disc 220.

While the principles of extending the electron paths above described are known, pumping speeds, up to a factor 10 over prior art pumps operating on those principles, have been obtained by the use of titanium or similar metal having "getting" characteristics as the grid material. During operation of the pump there is considerable sputtering action of the grid with a resultant increase on the pumping speed with the grid materials heretofore suggested and which do not "get." The use of a "getter" material for grid structure 274, permitting pumping speeds far beyond those previously believed possible in pumps of this type, represents a very important advance in the art. Further, the perforations 289 in the grid end walls and partition increase the pumping speed by increasing the ease of gas flow into the ion pump chamber. This represents an important advance in the art.

In addition to the primary pumping function of the device 208, the pump is utilized in accordance with the invention to also serve as a vacuum pressure gage. The relation between the gas pressure (degree of vacuum) within housing 272 and the potential applied between grid structure 274 and electrodes 276, 278 is such that the pump current is a measure of vacuum. This feature eases processing of the vacuum tube.

*Neutron Generator as Shown in FIGS. 16A to 20*

The neutron generator shown in FIGS. 16A to 20 is in many respects very similar to that shown in FIGS. 8 to 15, but it differs in various important details.

The generator is housed in an elongate cylinder 310, the cylinder being ordinarily between three and four feet in length and of a diameter, such as about four inches, to permit the unit to be lowered in the bore of an oil well or the like. One end of cylinder 310, the upper end during use, is capped by an insulating disc 314 held in place by a threaded metal ring 315. The disc 314 carries electric fixture 316 and 318 for connection to both an A.C. power source and to a remote source of pulsed actuating signals. The opposite end of the cylinder 310 is closed by a welded disc 317, the housing thus formed being hermetically sealed and it may be filled with oil or gas to protect the generator components from voltage breakdown.

Figure 16A:
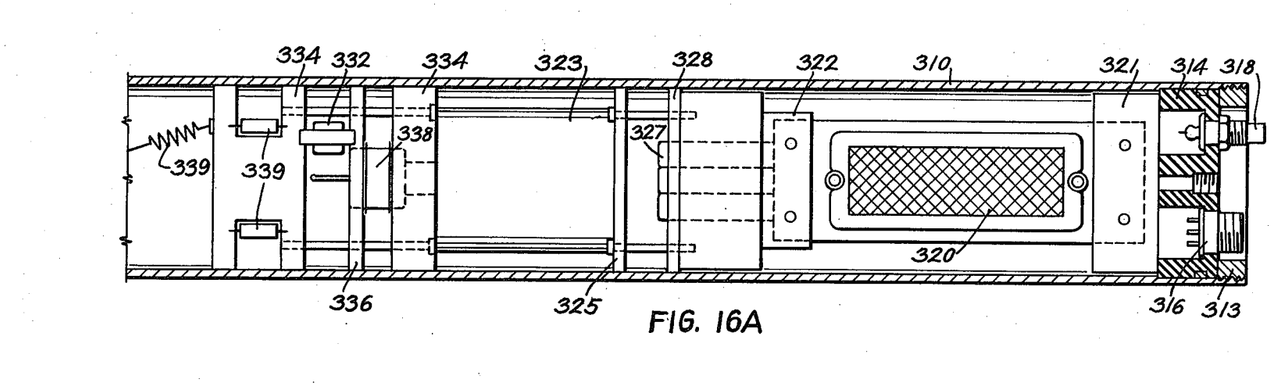
FIGS. 16A and 16B are respectively longitudinal sectional views of the front or lower portion and of the rear or upper portion of an alternative neutron generator embodying the invention.
Figure 16B:
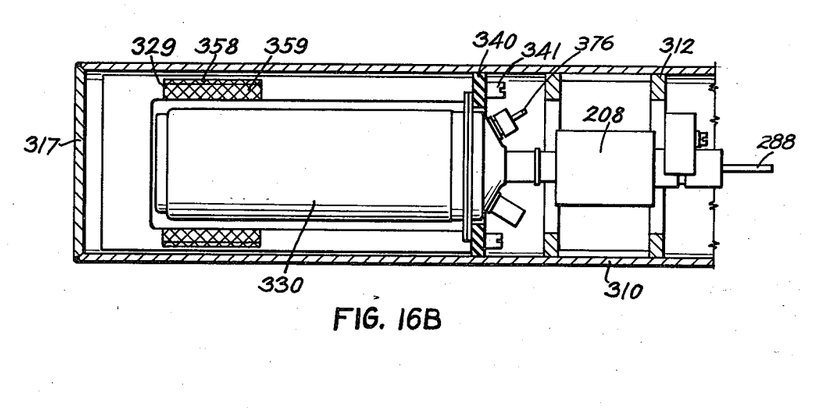
Figures 17, 18:
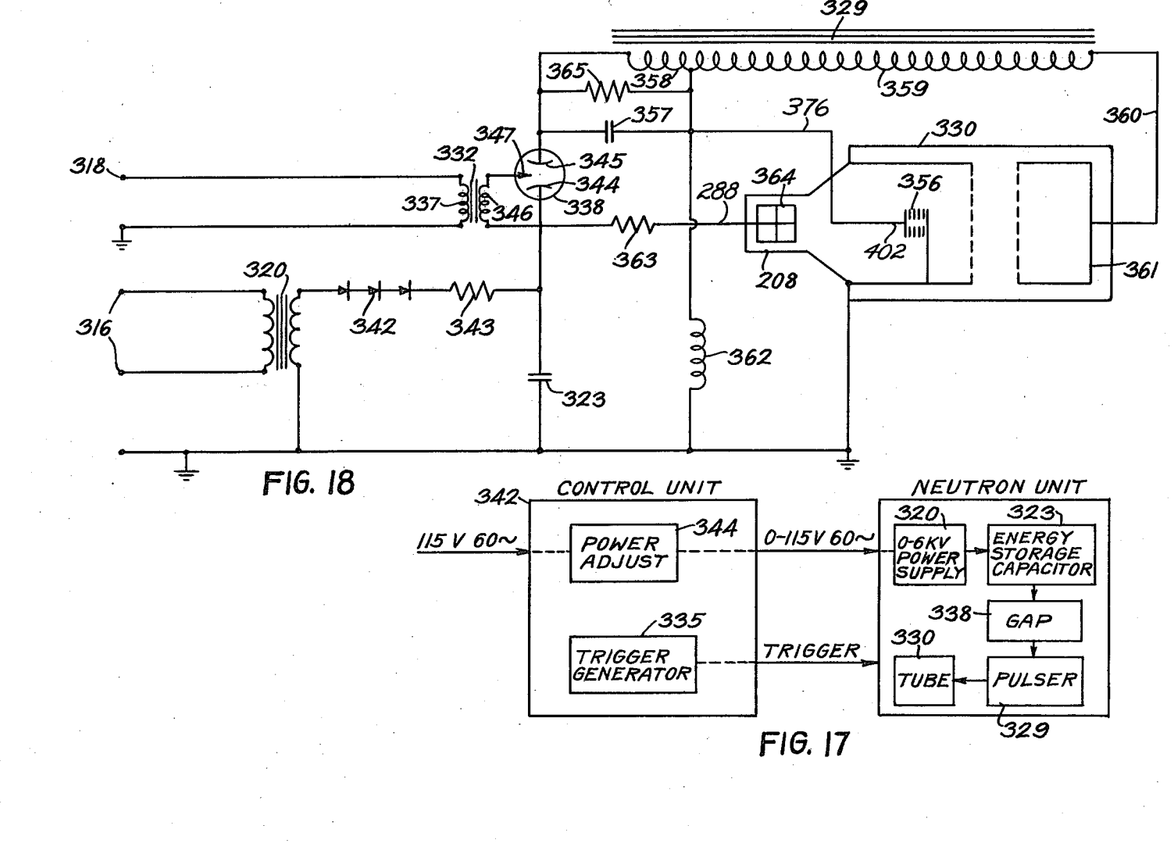
FIG. 17 is a circuit diagram for the device as shown in FIGS. 16A and 16B.
FIG. 18 is a block diagram generally similar to FIG. 7, but illustrating the neutron generator as shown in FIGS. 16A, 16B and 17.

Basically, the components within the housing 310, as shown in FIGS. 16A and 16B, include an A.C. power transformer 320 mounted between partitions 321 and 322 of electrically insulating material, a condenser 323 of large capacity mounted between partitions 324 and 325, three diodes 327 in fixtures supported by a partition 328, a target pulse transformer 329, a positive ion accelerator neutron source tube 330, a small pulse transformer 332 mounted between partitions 334 and 336, and a trigatron tube 338 and other small components 339 in partition 334 and between partition 334 and 312 to complete the assembly, the wiring diagram of which is shown in FIG. 18.

The glass and metal enclosure 330 above described is snugly received in the bore of the cylindrical target pulse transformer 329. The pulse transformer 329 is supported axially within the housing 310 by a suitable annular insulator 340. The transformer 329 is of the auto type with the windings encased in a cylindrical housing of epoxy resin cast under high pressure, for example at 3500 p.s.i., to obtain a rugged structure of high dielectric characteristics. Primary and secondary winding leads are brought out the right end through an insulating clamp bracket at the end of the transformer, one lead connection being shown at 341.

Referring to the circuit of FIGS. 17 and 18, operation of the device is as follows. With a source of alternating current from the control unit 342 and regulated by a power adjustment device 344 as shown, applied to transformer 329 through terminals 316, a D.C. output is applied across storage condenser 323 from the half wave rectifier network comprising diodes 342 and resistor 343, to charge condenser 323. The nongrounded side of condenser 323 is connected to the arcing electrode 344 of the trigatron control tube 338, electrode 345 is at ground potential until tube 338 is fired by the pulsed output of transformer 332, the secondary 346 of which is connected across the arcing electrodes 347 and 344 of the tube. The primary 337 of transformer 332 is pulsed from a remote trigger generator 335 in control unit 342, the generator output being connected to the transformer through terminal 318 and ground. The generator 335 is of a known type wherein the pulse rate may be varied at will.

When tube 338 is fired as controlled by pulse generator 335, electrode 345 of tube 338 is raised to the voltage which appeared on capacitor 323 and said capacitor 323 proceeds to discharge through the high voltage pulse transformer 329 and an ion source 356 which are connected in series. The ion source 356 comprises stacked titanium washers which are series connected between grounded ends. This ion source 356 is hereinafter described in detail, but it is generally similar to the ion source 190 shown in FIG. 9. Instantaneous arcing effected across the washers results in an attendant production of a localized deuterium ion plasma adjacent the arcing area of the stack.

In order to cause the ion source 356 to arc, the capacitor 357 connected in parallel relation to primary 358 of pulse transformer 329, serves to momentarily short said primary so as to apply full capacitor voltage of the capacitor to the ion source 356. A bleeder resistor 365 shunts the condenser 357, with the value of the resistor selected to limit the source arcing potential to that required. After the ion source 356 arcs to provide deuterium ions, as will be described below, the inductance 362, in parallel relation to ion source 356, provides a low impedance path for the discharge of the capacitor 323 through the primary 358 of the pulse transformer 329 so as to result in a high negative voltage on the secondary winding 359 of said pulse transformer. The secondary winding 359 is connected by a conductor 360 with the negative target electrode 361 in the ion accelerator tube 330. The transformer 329 is of the type wherein the primary and secondary windings are coextensive, the primary winding 358 surrounding the secondary winding 359.

Positive voltage from the capacitor 323 is connected through a resistor 363 to an electrode 364 of the ion pump 208 so as to cause vacuum pumping as will be described below.

Figure 19:
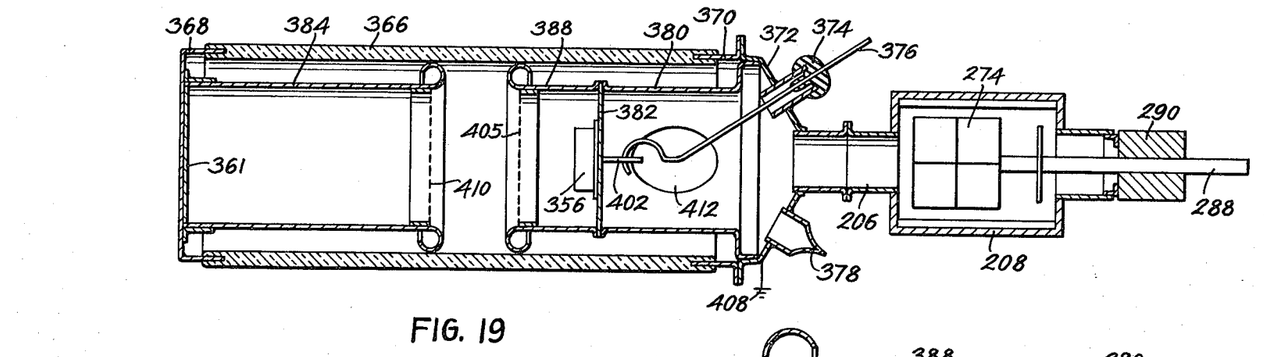
FIG. 19 is a fragmentary view showing in longitudinal section the ion source and related parts shown in FIGS. 16A, 16B, 17 and 18.

The positive ion accelerator tube, generically referred to as 330, is shown in the cutaway detail in FIG. 19. This tube includes a cylindrical glass insulator 366 the ends of which have bonded thereto, by glass to metal seals, metal sleevelike extensions 368 and 370. A metal cap 372 provides closure for the vacuum tube, the cap 372 being apertured to receive a lead-in insulator 374 for a conductor 376 connected to arc the ion source 356. The cap 372 has an inner flanged margin, as does the outer end of sleeve 370, with the flanges welded in unitary assembly to complete the end enclosure. A cylindrical connector 206, similar to that shown in FIG. 8, provides communication between the cap 372 and a vacuum pump, which may be the same as the previously described pump 208. The interior of the ion source assembly is evacuated and sealed at vacuum pinch-off 378 and continuously maintained by the pump 208 under a high degree of vacuum during use.

A metallic inner cylinder 380 is supported on the cap 372 by vacuum brazing, ion source 356 being positioned by a ring 382 near the opposite end of cylinder 380. The free end of the inner cylinder 380 is provided with a polished and shaped margin piece 383 of large diameter aperture through which ions are drawn by target 361 from the source 356 as explained in detail below.

The target 361 is attached to end cup 368 in electrical contact therewith. The target consists of tritium or deuterium which has been occluded into titanium or zirconium which is in adhering relationship to a stainless steel backing plate which provides supporting strength for the thin layer of titanium material. A metal cylinder 384 is supported from the cup 368 by a ring to provide shaping of the electrical field in the vicinity of the edges of cup 368 and to prevent electrical arcing at these edges.

The ion source 356 produces a high density space charge neutralized deuterium ion cloud or plasma when an interleaved stack of titanium discs or washers having tritium gas occluded therein are peripherally or internally arced by electrical pulses sufficiently to drive out the occluded deuterium or tritium. While it is broadly known to produce a plasma by arcing a stack of gas occluded discs, the present structure involves a novel and particularly effective disposition of the involved elements with confinement of the resulting plasma to a relatively small area from where it may rapidly be accelerated to target 361, which is of tritium loaded titanium, for the production of neutrons at a high output rate.

Figure 20:
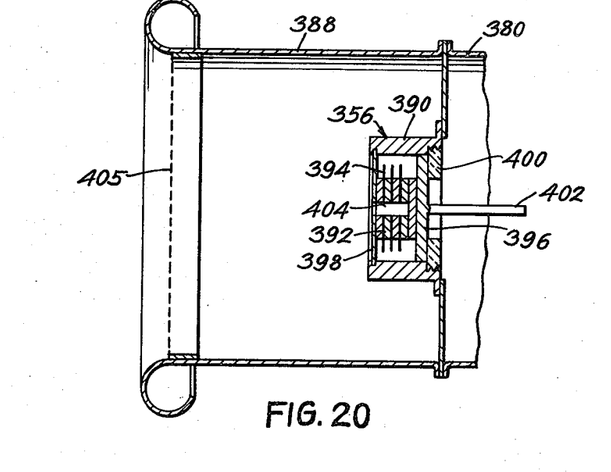
FIG. 20 is an enlarged fragmentary sectional view of the ion source shown schematically in FIG. 19.

The ion source 356, as best shown in FIG. 20, comprises a metal body 390 which encloses a stack of centrally apertured titanium deutride washers 392 interleaved between centrally apertured mica insulators 394. The assembly is maintained concentrically of the housing 390 and is clamped between a metallic disc 396 and a centrally apertured metal disc 398. The disc 396 is supported by a ceramic washer 400 which is apertured to receive an electrode 402 integral with the disc 396. The central apertures in the disc 398 and in the washers 392 and in the insulators 394 provide an axial channel 404. The electrode 402 is pulsed from a suitable source connected to the conductor 376 so as to cause the washers 392 to arc over along the peripheries of their aligned central aperture at the axial channel. The disc 398 provides an arcing pulse ground return through shield 388, cylinder 380, and the cylinder supporting structure. A plasma of deuterium ions is thus established in the channel or bore 404 as the tritium gas occluded titanium discs are arced.

The ions escape the bore 404 at the open end thereof. The simultaneous pulsing of target 361 results in the establishment of plural ion trajectories toward the target 361. As shown in FIG. 19, a source grid 406 is provided near the open end of the source shield 388 to extend transversely of the shield axis. The grid is fixed to the shield 388 and it is thus maintained at the ground potential of the shield supporting structure as shown at 408.

Figure 11:
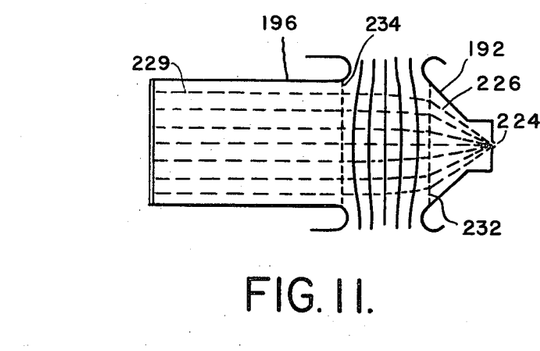
FIG. 11 is an electric field plot showing grid controlled ion trajectories in the device of FIG. 8.

The cylindrical target shield 384 is provided at the open end thereof with a grid structure 410 which is fixed thereto to be maintained at target potential. The grid extends substantially over the entire projected area of this target. The effect of grids 406 and 410 is about the same as shown in FIG. 11. The grounded source grid 406 permits ion trajectory divergency from the ion escape outlet of plasma source 404 to the plane of the grid 406. Thereafter the ion trajectory continues slightly to diverge until the trajectory lines are in parallelism with the axis of the target shield 384. The deuterium ions are thus drawn to the target in response to the target pulse potential along parallel paths which are evenly dispersed over the target area to insure evenly distributed neutron producing hits on the tritium loaded target. The ions are thus defocused in their path between the ion source and target by the field established by the grids.

The target shield 384 serves three functions. The first is to provide support for one of the ion defocusing grids. Secondly, the target shield protects the glass-to-metal seals from high voltage fields which might result in glass puncture. Thirdly, the resulting reduction in field size at the target substantially reduces secondary electron current.

As will be readily understood, the production of a plasma as above requires a surrounding vacuum, and since the arc expelled gases contaminate that vacuum, the glass and metal envelope which encloses the ion source must be pumped to maintain the desired degree of vacuum. The function of ion pump 208 is continuously to draw off the neutral gas which does not enter into the neutron producing reaction through target bombardment. The pump 208 is or may be the same in construction as that shown in FIGS. 8, 14 and 15 and previously described.

In order that the pump 208 may maintain a vacuum not only in its own chamber but also within source tube 330, a port 412 is provided in the side wall of the cylinder 380.

I claim:

1. A generator of radioactive radiation comprising an ion source, a target spaced from said source and including a substance adapted to react with impinging ions to produce radioactive radiation, means for projecting ions from said source to said target, means for confining ion travel between said source and target to optimum linear paths, means for enclosing said source, target, and ion path confining means in a container, and means for continuously evacuating and maintaining said container under a high degree of vacuum.

2. The device of claim 1 wherein said ion path confining means comprises a control grid and the vacuum is maintained in the order of at least about $1 \times 10^{-6}$ millimeters of mercury.

3. The device of claim 1 wherein said ion path confining means comprises a pair of control grids disposed in spaced relation between said source and target.

4. In a device of the character described, an elongated housing of electrically insulating material, a pulse transformer encircling said housing, a pair of electrical shields disposed within said housing, said shields having outer closed ends and spaced inner open ends in substantial alignment axially of said housing, a target positioned at the closed end of one of said shields and including a substance adapted to react with impinging ions to produce radioactive radiation, an ion source positioned within the other shield, means for pulsing said ion source to produce a plasma of positive ions suitable for said radiation producing target impingement, means cooperatively associated with said pulse transformer and said target for pulsing said target at a negative potential sufficient to accelerate ions from said source and effect impingement thereof on said target, and control grid means associated with one of said shields adjacent the inner open end thereof to confine the path of ion travel from said source to said target along optimum linear paths.

5. The device of claim 4 wherein said grid is mounted to the open end of said ion source enclosing shield to extend across the open end thereof.

6. The device of claim 4 wherein said grid is supported by said target enclosing shield to extend across the open end thereof.

7. The device of claim 4 including grids provided to extend across the open ends of both said ion source enclosing shield and said target enclosing shield.

8. Apparatus for generating neutrons comprising an evacuated receptacle having a target forming wall portion thereof of a transition metal with deuterium gas occluded therein, an ion source within said receptacle spaced from said wall portion, said ion source comprising a plurality of transition metal elements having tritium or deuterium gas occluded therein and interleaved with electrically insulating elements to form a stack, means for electrically arcing the metallic elements of said ion source to produce a plasma of positive tritium ions, means for electrically pulsing said target with a negative potential sufficiently high to cause neutron producing collisions between the tritium ions of the plasma and the deuterium ions of said target, and grid control means positioned within the path of ion travel between said plasma and said target to insure ion travel therebetween along spaced optimum linear parallel paths.

9. A pulsed neutron source comprising an evacuated envelope containing means for the production of positive ions in response to an electrical pulse, means for periodically pulsing said source, an electrically conductive target within said envelope spaced from said source, said electrically conductive target comprised, at least in part, of a material which will emit neutrons under positive ion bombardment, means for pulsing said target with a negative potential, grid control means intermediate said source and target to direct target bombarding ions along optimum linear paths between said source and said target, and means for continuously evacuating said envelope.

10. The device of claim 9 wherein said evacuating means comprises an ion pump consisting of an evacuable envelope defining a space adapted to contain gas molecules, means coupled to said envelope for ionizing said molecules including cathode and anode elements between which electrons are accelerated to ionize said molecules by bombardment, means producing a magnetizing field directed axially of said device to increase the length of path travelled by said electrons before collection by anode element whereby molecular ionization efficiency is enhanced, a member of absorbent material positioned within said envelope transverse to the path of said ionized and accelerated molecules, and means driving the ionized molecules into said absorbent member whereby said gas molecules are removed from said space.

11. In a neutron generator, an elongated evacuated envelope, a target of a transition metal forming a closure at one end thereof, an ion source disposed in said envelope in spaced relation to said target and comprising a plurality of interleaved dielectric and metallic elements provided with aligned apertures defining a chamber, said metallic elements having a hydrogen isotope occluded therein, means for maintaining said envelope evacuated, an electrode extending into said chamber, means for applying a pulsed arcing potential between said electrode and said interleaved metallic elements for the production of a plasma of positive hydrogen isotope ions in said chamber, a pulse transformer encircling said envelope to accelerate said plasma ions into collision with said target for the production of high energy neutrons, and control grid means in the path of ion travel from said source to said target to direct the source ions along linear paths during travel through the electrical and magnetic fields established by said pulse transformer.

12. In a device of the character described, an elongate envelope of electrically insulating material having one end closed by a target of a transition metal having a hydrogen isotope occluded therein, an ion source comprising a stack of interleaved di-electric and metallic annuli enclosed within said envelope and defining a bore extending along the major axis of the envelope, said metallic annuli having hydrogen isotopes occluded therein, an ion pump associated with said envelope for the continuous evacuation thereof, means for applying a pulse potential across said stack to effect ion initiating arcing between metallic annuli within said bore, and means for simultaneously pulsing said target at a substantial potential to accelerate ions from within said bore to said target for the production of neutrons.

13. The device of claim 12 wherein said means for applying a substantial pulsed potential difference between said target and said stack comprises an electrical pulse transformer at least partially enclosing said envelope.

14. A vacuum sealed and continuously pumped pulsed neutron generator capable of sustained operation with an output of about $10^7$ neutrons per each pulse of about 4 micro-seconds, said generator including in combination, a stack of interleaved metal washers having a hydrogen isotope occluded therein and di-electric discs with the washers and discs substantially flush through a minor peripheral arc and the discs extending outwardly beyond the washers throughout a major peripheral arc, means for peripherally arcing the flush portions of said washers to produce an ion plasma, a metal target having a hydrogen isotope occluded therein spaced from said stack, a high potential pulsed source connected between said ion source and target for the acceleration of ions into high energy contact with said target, and means for confining ion travel between said source and target to linear trajectories.

15. The device of claim 14 wherein said washers have tritium occluded therein and said target has deuterium occluded therein.

16. The device of claim 14 wherein said washers have deuterium occluded therein and said target has tritium occluded therein.

17. The device of claim 14 wherein both said washers and said target have deuterium occluded therein.

18. In a device of the character described, an ion source comprising a plurality of metallic annuli having a gaseous hydrogen isotope occluded therein and a plurality of electrically insulating annuli interleaved therebetween in eccentric relation to the metallic annuli to position minor peripheral areas of the insulating annuli in substantial registry with minor peripheral areas of the metallic annuli and permit inter-arcing of the metallic annuli throughout said areas, and means connected to at least the outermost two metallic annuli for applying a pulsed arcing potential thereto to effect production, during inter-arcing of the discs, of an ion plasma adjacent said areas.

19. A pulsed neutron generator including in combination, an electrical arc powered plasma source, means for normally confining arc initiated plasma within the area of the source, a target spaced from said source, means including a pulse transformer encircling the path of ion travel between said source and target for pulsing said target and accelerate ions from said plasma into neutron producing collision with said target, and a grid for directing ion travel from said plasma generator to said target along linear paths through the electrical and magnetic fields established by said target pulse transformer.

20. In a neutron generator of the type including an ion source for the production of a plasma in response to an arcing potential applied thereacross and a target spaced from said ion source and requiring high potential pulsing for the acceleration of ions from said source to effect neutron producing collisions with said target, a control circuit including a first pulse transformer for the arcing of said source and a second pulse transformer for the application of a high surge potential to said target, said circuit including means for pulsing said first transformer, means for the capacitive storage of direct current for the pulsed excitation of said second transformer, and an electron discharge device cooperatively associated with the secondary of said first pulse transformer and the primary of said second pulse transformer, said discharge device adapted to be rendered conductive in response to the pulsing of said first transformer to simultaneously connect said capacitively stored potential to the primary of said second transformer to effect acceleration of ions from said source to said target.

References Cited in the file of this patent
UNITED STATES PATENTS

| | | |
|---|---|---|
| 2,689,918 | Youmans | Sept. 21, 1954 |
| 2,712,081 | Fearon | June 28, 1955 |
| 2,764,707 | Crawford et al. | Sept. 25, 1956 |
| 2,806,161 | Foster | Sept. 10, 1957 |
| 2,906,903 | Graves | Sept. 29, 1959 |
| 2,914,677 | Arnold | Nov. 24, 1959 |
| 2,926,271 | Brinkerhoff | Feb. 23, 1960 |